United States Patent
Seidl et al.

(10) Patent No.: US 12,109,887 B2
(45) Date of Patent: Oct. 8, 2024

(54) ROOF CONSOLE FOR A VEHICLE

(71) Applicant: Volkswagen Aktiengesellschaft, Wolfsburg (DE)

(72) Inventors: Nicolas Seidl, Braunschweig (DE); Marcel Rosilius, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 582 days.

(21) Appl. No.: 17/413,509

(22) PCT Filed: Nov. 29, 2019

(86) PCT No.: PCT/EP2019/083032
§ 371 (c)(1),
(2) Date: Jun. 11, 2021

(87) PCT Pub. No.: WO2020/120166
PCT Pub. Date: Jun. 18, 2020

(65) Prior Publication Data
US 2022/0048390 A1    Feb. 17, 2022

(30) Foreign Application Priority Data
Dec. 13, 2018 (DE) ............... 10 2018 221 709.2

(51) Int. Cl.
*B60K 35/00* (2024.01)
*B60K 35/10* (2024.01)
(Continued)

(52) U.S. Cl.
CPC ............ *B60K 35/00* (2013.01); *B60R 16/02* (2013.01); *B60K 35/10* (2024.01); *B60K 35/60* (2024.01);
(Continued)

(58) Field of Classification Search
CPC ............ B60K 2370/00; B60K 2370/10; B60K 2370/111; B60K 2370/115;
(Continued)

(56) References Cited

U.S. PATENT DOCUMENTS 7,410,202 B2   8/2008  Rose et al. ........... 296/146.2
8,718,797 B1   5/2014  Addepalli et al. ........ 700/17
(Continued)

FOREIGN PATENT DOCUMENTS

CN   106476723 A   3/2017  ........... B60J 1/00
CN   207657609 U   7/2018  ........... B60K 37/06
(Continued)

OTHER PUBLICATIONS

German Office Action, Application No. 102018221709.2, 6 pages, Oct. 7, 2019.
(Continued)

*Primary Examiner* — Anthony R Jimenez
(74) *Attorney, Agent, or Firm* — Slayden Grubert Beard PLLC

(57) ABSTRACT

A roof console for a vehicle has at least one touch-slide operating element for controlling functional elements of the vehicle. A touch-slide operating element in the sense of this application is a touch-sensitive operating element with a one-dimensional extent. As a result of the one-dimensional extent, the operating elements can beneficially recognize gestures in the form of tapping and swiping which permits excellent blind operation. The swiping movements can also be detected in both directions of the one-dimensional extent.

14 Claims, 3 Drawing Sheets

(51) Int. Cl.
*B60K 35/60* (2024.01)
*B60R 16/02* (2006.01)

(52) U.S. Cl.
CPC .................. *B60K 2360/139* (2024.01); *B60K 2360/1434* (2024.01); *B60K 2360/1468* (2024.01); *B60K 2360/771* (2024.01)

(58) Field of Classification Search
CPC .......... B60K 2370/119; B60K 2370/12; B60K 2370/133; B60K 2370/143; B60K 2370/1438; B60K 2370/1442; B60K 2370/1446; B60K 2370/146; B60K 2370/1472; B60K 2370/152; B60K 2370/155; B60K 2370/16; B60K 2370/771; B60K 2370/139; B60K 2370/1434; B60K 2370/1468; B60K 35/00; B60K 35/10; B60K 35/60; B60R 16/02; H01H 2003/00; H01H 2003/0293; H01H 2239/006; H01H 2239/064; H01H 2239/074; H01H 2231/026
USPC .......................................................... 200/1 R
See application file for complete search history.

(56) References Cited

U.S. PATENT DOCUMENTS

| | | | |
|---|---|---|---|
| 8,796,575 B2 | 8/2014 | Salter et al. | ................. 200/600 |
| 9,669,712 B2 | 6/2017 | Borghi | |
| 10,082,877 B2 | 9/2018 | Tokish et al. | |
| 10,821,925 B2 | 11/2020 | Wild et al. | |
| 2013/0204457 A1 | 8/2013 | King et al. | ........................ 701/1 |
| 2015/0353005 A1* | 12/2015 | Hodgson | ................. G06F 3/016 362/546 |
| 2017/0253121 A1 | 9/2017 | Kwon et al. | |
| 2018/0147922 A1 | 5/2018 | Entenmann et al. | |
| 2019/0324637 A1* | 10/2019 | Rosilius | .............. G06F 3/04842 |

FOREIGN PATENT DOCUMENTS

| | | | | |
|---|---|---|---|---|
| DE | 102009036520 A1 | 2/2011 | ............ | B60R 16/02 |
| DE | 102013002036 A1 | 8/2013 | ............ | B60R 16/02 |
| DE | 102014015403 A1 | 3/2015 | ............ | B60R 16/02 |
| DE | 102014008432 A1 | 12/2015 | ............ | B60J 7/057 |
| DE | 102015200006 A1 | 7/2016 | ............ | B60N 2/02 |
| DE | 102015015315 A1 | 6/2017 | ............ | B60R 13/02 |
| DE | 102017104403 A1 | 9/2017 | ............ | B60R 16/02 |
| DE | 102018221709 A1 | 6/2020 | ............ | B60R 16/02 |
| EP | 1818961 A1 | 8/2007 | ............ | B60R 16/02 |
| WO | 2020/120166 A1 | 6/2020 | ............ | B60K 37/06 |

OTHER PUBLICATIONS

International Search Report and Written Opinion, Application No. PCT/EP2019/083032, 17 pages, Feb. 10, 2020.

Chinese Office Action, Application No. 201980082430.3, 7 pages, Jan. 22, 2024.

\* cited by examiner

ROOF CONSOLE FOR A VEHICLE

CROSS-REFERENCE TO RELATED APPLICATIONS

This application claims priority to German Patent Application No. DE 10 2018 221 709.2 filed on Dec. 13, 2018 with the German Patent and Trademark Office. The contents of the aforesaid Patent Application are incorporated herein for all purposes.

TECHNICAL FIELD

The invention relates to a roof console for a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Roof consoles are present in many vehicles, in particular passenger motor vehicles, the operating elements being frequently integrated therein for a sliding and/or tilting roof, optionally for a sun shade for the sliding or tilting roof, for the interior lighting and possibly further vehicle functions. The roof consoles are generally arranged at the front, between the sliding/tilting roof and windshield and centrally relative to the vehicle width. The operating elements for the sliding and/or tilting roof are generally mechanical multi-way switches which are arranged in the roof console, the various roof functions being switchable thereby.

The mechanical multi-way switches which are cost-intensive and prone to breakdown are a drawback in these roof consoles. In addition, it is difficult to encompass the automatic and manual opening or, respectively, closing procedures of all of the opening functions (such as sliding and tilting functions) via the multi-way switch.

SUMMARY

An object exists to provide an improved roof console.

The object is solved by a roof console having the features of claim 1. Embodiments of the invention are described in the dependent claims, the following description, and the drawings.

DETAILED DESCRIPTION

Figure 1:
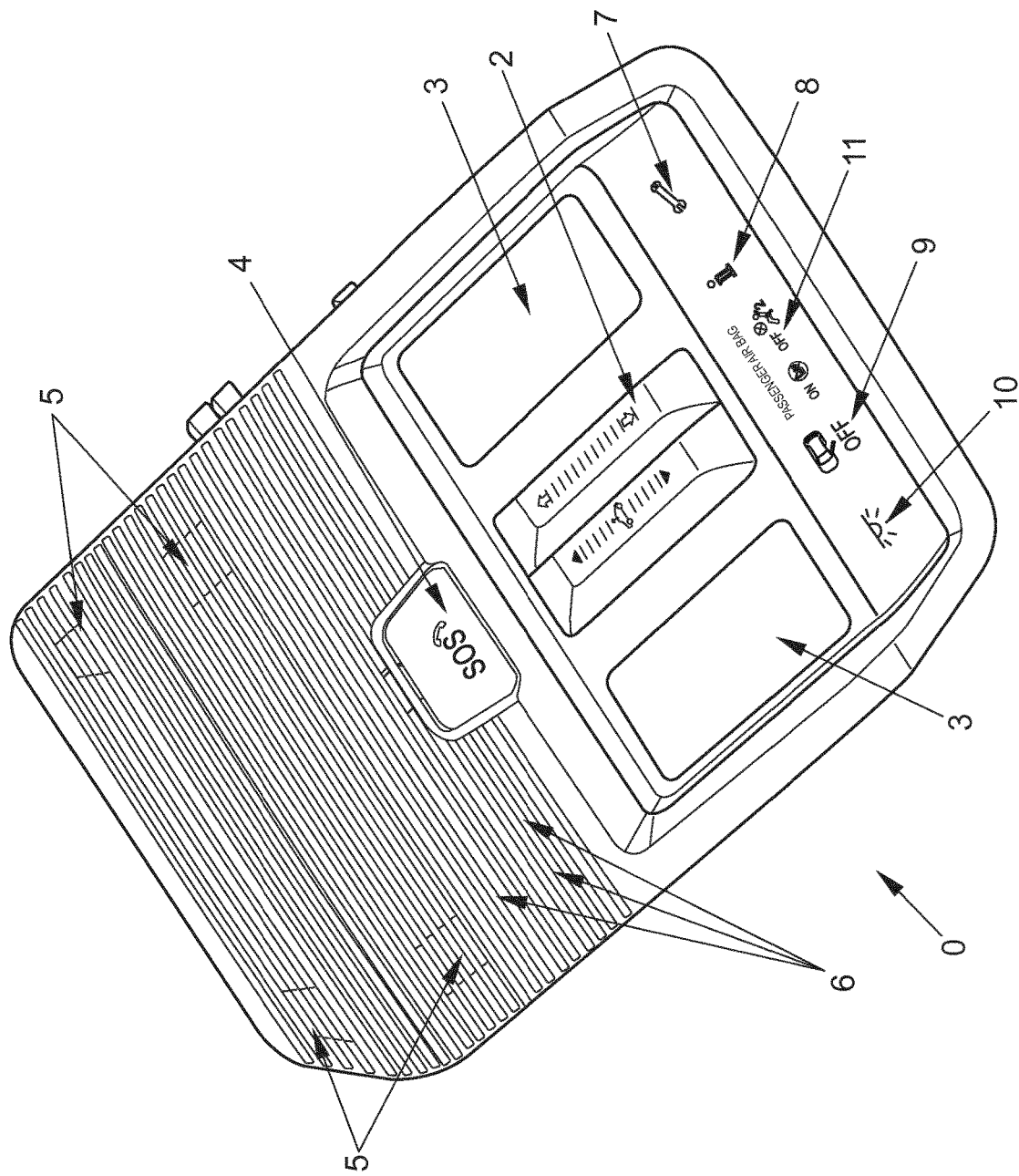
FIG. 1 shows an exemplary roof console.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The roof console for a vehicle according to a first exemplary aspect has at least one touch-slide operating element. In the context of this application, a touch-slide operating element is a touch-sensitive operating element with a one-dimensional extent. As a result of the one-dimensional extent, touch-slide operating elements may recognize gestures in the form of tapping and swiping, whereby a plurality of gestures and commands may be implemented. The swiping movements may also be detected in both directions of the one-dimensional extent. For example, the sensors of the touch-sensitive operating elements may be capacitive sensors since these sensors are inexpensive to obtain and have a good response behavior. However, other systems, for example optical or resistive sensors, may also be used in corresponding embodiments.

The touch-slide operating element of the roof console according to the present exemplary aspect is provided for controlling functional elements of the vehicle. In some embodiments, the functional elements may be, for example, a sliding and/or tilting roof, a sun blind or other openable sun shade of a sliding/tilting roof, functional glass, for example electrochromic glass which permits darkening and is used as a sun shade, a convertible top, a motorized tailgate, a window lifter or interior lighting of the vehicle. In order to permit the operation of a plurality of functional elements of the vehicle via a touch-slide operating element, buttons (which may be also designed as a touch-sensitive operating element) may be provided in the surroundings of the touch-slide operating element, the user selecting thereby the functional element to be controlled by the touch-slide operating element. In some embodiments, the buttons for the selection are in the immediate surroundings of the touch-slide operating element in order to permit a single-handed operation. Beneficially, therefore, a simple and clear operation may be implemented for a plurality of vehicle functions.

In this context, a sliding/tilting roof describes an openable roof which, by means of a sliding function, moves a roof region, which is to be opened, above, into or below an adjacent roof region. Many sliding roofs also have a tilting function in which the roof is lifted upwardly with its rear region viewed in the direction of travel, whereby an exchange of air is possible without the rain being able to penetrate into the vehicle. The present teachings can be used both in the case of pure sliding roofs, pure tilting roofs and combinations thereof.

In some embodiments, two functional elements of the vehicle can also be controlled in parallel by means of a touch-slide operating element. For example, when opening the sliding function of the roof, at the same time the sun shade can be simultaneously opened therewith. Therefore, the operation can be further simplified and thus also the distraction of the driver minimized.

The roof console according to the present exemplary aspect has a control device which recognizes and converts the input gestures into control signals for the target device (sliding/tilting roof, sun blind, etc.).

In some embodiments, the roof console is configured such that a swiping movement over a defined length 11 triggers an automated complete opening or closing of the roof or the sun blind. In some embodiments, a swiping movement in the opening direction of the sliding roof causes an opening of the roof and a swiping movement in the closing direction of the roof causes the closing thereof. The defined length 11 in this case is selected such that a substantial part of the touch-slide operating element is swept without the user having to take care to sweep the entire length. In some embodiments, the length 11 is between 50% and 90% of the total length of the touch-slide operating element, for example between 60% and 80%. Thus, by a simple, rapid gesture which can be carried out blind, the user can cause a complete opening or, respectively, closing of the roof.

In some embodiments, by tapping again at any point on the touch-slide operating element the user can stop the automated complete opening or closing movement. In this case, the sensitivity of the touch-slide operating element is In some embodiments set such that accidental operation by coming close, for example by blindly searching for a different operating element of the roof console, can be minimized. This way, the user can set the roof or the sun shade to the desired opening width by means of a gesture which barely requires any attention.

In some embodiments, the roof console is configured such that a swiping movement over a defined length 12 and the subsequent pausing of the finger after the swiping movement at the end point of the swiping movement triggers an opening or closing movement, which lasts until the finger is lifted off. The defined length 12 is selected to be similar to the length 11 such that the operation is simple and barely requires any attention and can be easily carried out blind, but accidental operations are minimized. In some embodiments, the length 12 is between 50% and 90% of the total length of the touch-slide operating element, for example between 60% and 80%. Therefore, a further possibility of the operation of the roof or sun shade is provided, whereby the operation is more intuitive.

In some embodiments, the touch-slide operating element of the roof console is configured such that tapping at any point on the touch-slide operating element causes a movement into the tilted position or a closing of the roof from the tilted position. In some embodiments, the opening or the closing procedure may be stopped by tapping again, and thus the tilted position of the roof can be set. Beneficially a simple, rapid gesture which is able to be carried out blind and which minimizes the distraction of the driver is also achieved here.

In some embodiments of the roof console, the touch-slide operating element is configured to control a sliding roof or sun shade such that tapping in the edge regions of the touch-slide operating element causes a movement in the direction provided by the edge region. In some embodiments, the movement of the roof or sun shade is carried out as long as the finger rests against the touch-slide operating element.

In some embodiments, automatic running may also be started by tapping briefly in the edge region. However, the above-described operation of the tilting function is then limited to the central region of the touch-slide operating element.

In this case the edge regions are selected such that no excessive precision is required for the user to find the position but a clear demarcation is also provided for the central region. In some embodiments, the front or rear edge region in each case has a length of 5%-20% of the total length of the touch-slide operating element, but especially between 10% and 15%. Therefore, a further operating possibility is provided.

In some embodiments, the roof console has two touch-slide operating elements which are positioned directly adjacent to one another and which are also of the same size. By positioning said touch-slide operating elements directly adjacent to one another it is possible to control both touch-slide operating elements at the same time with two fingers of one hand. In some embodiments, the touch-slide operating elements for a sliding roof and a sun shade for the sliding roof are positioned adjacent to one another since beneficially in this manner the sliding roof and the sun shade are able to be operated at the same time.

In some embodiments, the center of the touch-slide operating element is haptically perceptible to the user, for example by a particular structuring of the surface. In some embodiments, the entire surface of the touch-slide operating element is haptically distinct from the surrounding surface, for example by corrugations in the transverse direction relative to the direction of extent of the touch-slide operating element. In some embodiments, the spacing between the transverse corrugations and the edge region of the touch-slide operating element increases. Such an embodiment simplifies a blind operation significantly, since not only the finding of the touch-slide operating element is simplified but also the finding of the position.

In some embodiments, the roof console additionally has dimmable lighting. In some embodiments, this lighting is centrally arranged interior lighting and/or lighting which is oriented centrally to the side and toward the front seats and which is particularly suitable for reading. In some embodiments, the lighting is implemented by means of LEDs since these are cost-effective and energy-saving. In some embodiments, the lighting is dimmable.

The operation of the dimmable lighting is for example implemented by the light exit surface itself being designed as a touch-sensitive operating element. In some embodiments, an adjacent region may also be configured as a touch-sensitive operating element. In some embodiments, the operation may be carried out by tapping, i.e., placing the finger onto and subsequently removing the finger from the touch-sensitive operating element for switching on/off. When tapping and holding the finger on the operating element, also denoted as a long press, after a short delay the light intensity slowly reduces until the user takes the finger off the touch-sensitive operating element. Alternatively, an increase in the light intensity may also be triggered by tapping and holding until the user takes the finger off the touch-sensitive operating element of the lighting. Beneficially, the combination of all of the lighting functions into one operating element permits a simple, intuitive blind operation, for example when the light exit surface is at the same time the operating element, since visual recognition of the operating elements adjacent to the light exit surfaces is only possible with great difficulty when the lighting is switched on.

In some embodiments, an operation of the rear lighting of the vehicle is also possible via operating elements in the roof console, which are for example also dimmable via a touch-sensitive operating element as described above. Therefore, the entire interior lighting of the vehicle may be controlled from the front seats.

Further operating elements which are for example designed as a touch-sensitive operating element may be an SOS button, an information call button or breakdown call button, a button for door contact preselection (i.e., the preselection as to whether the lighting is to be automatically switched on when opening a door), a button for opening or closing the tailgate or trunk lid, a button for opening and closing a convertible top or a button for the entire interior lighting. In some embodiments, in this case the SOS button is arranged below a safety flap, in order to prevent undesired triggering. Functional feedback can be implemented via the backlighting of a symbol arranged in the touch-sensitive operating element, for example via a change in color. In this case, the backlighting of the touch-sensitive operating elements may be implemented via a light guide in a manner which saves installation space.

In this case, all of the touch-sensitive operating elements of the roof console are in some embodiments haptically perceptible to the user so that the user can blindly find and operate the touch-sensitive input regions. To this end, the touch-sensitive input region of a touch-sensitive operating element has a surface which is differently haptically perceptible relative to its surroundings, for example entirely or partially roughened, entirely or partially coated, or otherwise structured. The surface of the touch-sensitive input region may additionally be distinct relative to its surroundings, i.e., raised or recessed, or at least partially have a border. In this manner, a blind operation may be facilitated since the touch-sensitive input region can be found without eye contact and simply by haptic perception.

In some embodiments, the roof console has a digital microphone which may be used, for example, for a hands-free function of the vehicle or even for voice control. Due to the position of the microphone in the roof console, voice signals from the driver or passenger position may be recorded with little influence from ambient noise.

In some embodiments, further displays for vehicle functions may be provided in the roof console. These displays are for example designed as back-lit symbols. The displays may then be implemented by switching the backlighting on/off or even by a change in color. Examples of displayable vehicle functions are a passenger airbag off display or even a door contact display, i.e., information about vehicle doors which are still open. The displays are especially arranged so as to be clearly visible in the roof console for all of the vehicle occupants.

In some embodiments, the roof console has a sensor system for monitoring the vehicle interior, which can be used, for example, for alarm systems. The interior, for example the rear region, is monitored in a particularly effective manner from the position of the roof console.

In some embodiments, the electrical connection of the roof console to the vehicle is provided by a multi-pin connector. Thus, the assembly effort can be reduced.

Unless otherwise stated in an individual case, the various embodiments mentioned herein may be combined together.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a roof console 0. This roof console is provided for installation in a vehicle roof. This roof console has a touch-slide operating element: roof 1 for opening the panoramic roof of the vehicle. A further touch-slide operating element: sun shade 2 is for opening the sun shade arranged in the panoramic roof. By the positioning of the two touch-slide operating elements: roof 1 and sun shade 2 directly adjacent to one another, the user can operate both touch-slide operating elements 1, 2 at the same time by using two fingers, for example the index finger and middle finger.

The roof console 0 also has two light exit surfaces 3 which are oriented toward the front seats. The light exit surfaces 3 are at the same time touch-sensitive operating elements. By tapping the touch-sensitive operating elements, i.e. the light exit surfaces 3, the lighting is switched on and off. With a long press, i.e. placing and holding the finger on the light exit surface 3, after a short delay the lighting intensity is slowly reduced when the lighting is switched on and slowly increased when the lighting is switched off, until the finger is taken off the light exit surface 3.

The roof console 0 also has an SOS button 4 which is arranged below a protective flap which has to be opened in order to be triggered.

Openings 5 for sensor systems of the interior monitoring system located behind said openings are arranged on the side of the roof console 0 remote from the windshield. Openings 6 for a digital microphone are located adjacently on the side facing the driver. The openings 5 and 6 are arranged in matt black plastic with a corrugated surface.

The roof console 0 has a touch-sensitive operating element for a breakdown call 7 and a touch-sensitive operating element for an information call 8, a touch-sensitive operating element for the door contact preselection 9 and a touch-sensitive operating element for the interior lighting 10. All of the touch-sensitive operating elements 7-10 are characterized by a symbol with backlighting, wherein an activation causes a change in color of the symbol. Additionally a passenger airbag off display 11 is present. The touch-sensitive operating elements for breakdown call 7, information call 8, door contact preselection 9 and interior lighting 10 and the passenger airbag off display 11 are located adjacent to one another on the side of the roof console 0 facing the windshield and have a high gloss surface produced by "in mold labeling".

Figure 2:
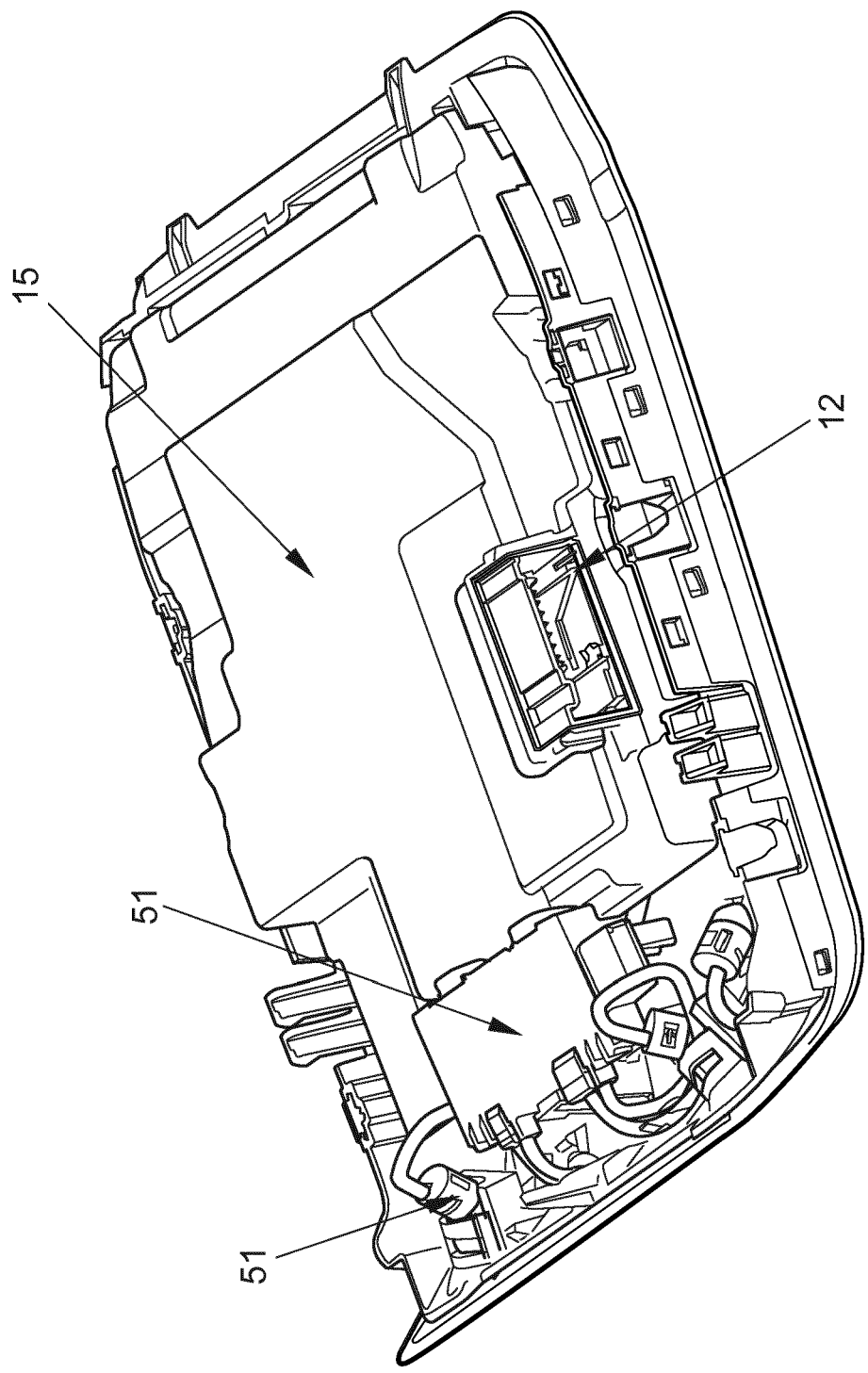
FIG. 2 shows the rear face of the roof console of FIG. 1.

FIG. 2 shows the installed side, i.e. the side concealed in the installed state, of the roof console 0. A central electrical contact 12 in the form of a 26-pin socket is arranged on this side. All of the required electrical connections between the roof console 0 and the vehicle are combined in the central electrical contact 12. The sensor system and the control electronics for the interior monitoring 51 and a cover 15 of the electronics located thereunder can also be seen.

Figure 3:
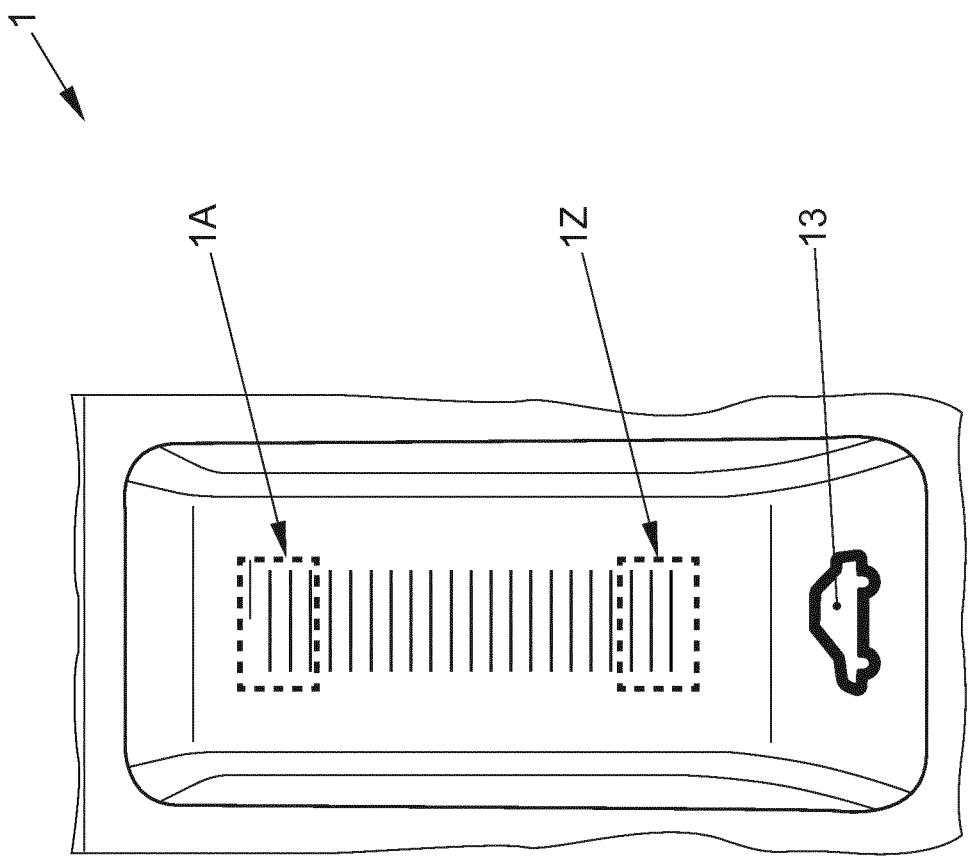
FIG. 3 shows a more detailed view of an exemplary touch-slide operating element.

FIG. 3 shows a larger view of the touch-slide operating element: roof 1. This touch-slide operating element has edge regions 1A, 1Z and an adjacently arranged vehicle symbol 13. In the installed position the vehicle symbol 13 faces the windshield. It is mentioned for clarity that the frames of the edge regions 1A, 1Z which are identifiable in the FIG. are only visible for the purposes of illustration.

The operating logic of the touch-slide operating element: roof 1 is as follows:
1. Tapping once on the edge regions 1A, 1Z causes an automatic complete opening or closing of the sliding function. Tapping on the edge region 1Z, i.e. the side of the touch-slide operating element 1 facing the windshield, causes a complete closing of the sliding function and tapping on the edge region LA causes a complete opening of the roof area.
2. Tapping and holding (long press) on the edge regions 1A, 1Z causes an opening or, respectively, closing movement similar to point 1, but which stops when the finger is lifted off the edge region 1A, 1Z of the touch-slide operating element 1.

3. Tapping during an automatic opening or closing procedure of the sliding function causes a stop at the current position.

4. In the closed position of the roof, tapping at any point of the touch-slide operating element: roof 1 causes a sliding of the roof. Tapping again in the tilted state causes a closing of the tilting function. Tapping during the movement into or out of the tilted function causes a stop in the current position.

5. A swiping movement in the direction of the edge region 1A causes a complete opening of the sliding function. A swiping movement in the direction of the edge region 1Z causes a complete closing of the roof, i.e. irrespective of whether it is a tilting or sliding function.

6. A swiping movement with a subsequent pausing of the finger causes an opening or closing movement of the sliding function until the finger is taken off the touch-slide operating element: roof 1. In this case, a swiping movement also causes an opening in the direction of the edge region LA and a closing in the direction of the edge region 1Z.

The operating logic of the touch-slide operating element: sun shade (see FIG. 1) is similar to the above-described operating logic of the touch-slide operating element: roof 1. However the operating functions for the tilting function under point 4 are dispensed with. The operation of the darkening of functional glass can also be carried out in a similar manner.

LIST OF REFERENCE NUMERALS

0 Roof console
1 Touch-slide operating element: roof
2 Touch-slide operating element: sun shade
3 Light exit surface
4 SOS button
5 Sensor system-interior monitoring openings
51 Sensor system and control electronics of interior monitoring
6 Microphone openings
7 Touch-sensitive operating element: breakdown call
8 Touch-sensitive operating element: information call
9 Touch-sensitive operating element: door contact preselection
10 Touch-sensitive operating element: interior lighting
11 Display: passenger airbag off
12 Central electrical contact
13 Vehicle symbol
1A Edge region
1Z Edge region The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A roof console for a vehicle having at least one touch-slide operating element which is configured for controlling at least one functional element of the vehicle; wherein
   the at least one touch-slide operating element is configured such that a swiping movement over a defined length and a resting of a finger on the at least one touch-slide operating element after the swiping movement triggers an opening or closing movement of the at least one functional element of the vehicle, which lasts until the finger is removed from the at least one touch-slide operating element; and
   wherein the at least one touch-slide operating element is configured to control a sliding/tilting roof such that tapping in a first of multiple edge regions of the at least one touch-slide operating element causes a movement in a direction provided by the first edge region.

2. The roof console of claim 1, wherein the touch-slide operating element is configured to control a sliding/tilting roof such that tapping at any point on the touch-slide operating element causes a movement into a tilted position or a closing of the sliding/tilting roof from the tilted position.

3. The roof console of claim 1, wherein the roof console has two touch-slide operating elements which are arranged directly adjacent to one another.

4. The roof console of claim 1, wherein the roof console has one or more of the following components: a dimmable lighting, a digital microphone, a passenger airbag off display, a sensor system for monitoring the vehicle interior, and a SOS button.

5. The roof console of claim 1, wherein the at least one functional element of the vehicle comprises one or more of a sliding and/or tilting roof, an openable sunshade of a sliding/tilting roof, a convertible top, a motorized tailgate, and a window lifter.

6. The roof console of claim 5, wherein the touch-slide operating element has a capacitive sensor.

7. The roof console of claim 5, wherein the touch-slide operating element is configured such that the swiping movement over a defined length triggers an automated complete opening or closing of the at least one functional element of the vehicle.

8. The roof console of claim 5, wherein the touch-slide operating element is configured to control a sliding/tilting roof such that tapping at any point on the touch-slide operating element causes a movement into a tilted position or a closing of the sliding/tilting roof from the tilted position.

9. The roof console of claim 1, wherein the touch-slide operating element has a capacitive sensor.

10. The roof console of claim 9, wherein the touch-slide operating element is configured such that the swiping movement over a defined length triggers an automated complete opening or closing of the at least one functional element of the vehicle.

11. The roof console of claim 9, wherein the touch-slide operating element is configured to control a sliding/tilting roof such that tapping at any point on the touch-slide operating element causes a movement into a tilted position or a closing of the sliding/tilting roof from the tilted position.

12. The roof console of claim 1, wherein the touch-slide operating element is configured such that the swiping movement over a defined length triggers an automated complete opening or closing of the at least one functional element of the vehicle.

13. The roof console of claim 12, wherein tapping at any point on the touch-slide operating element during the automated complete opening or closing stops the automated complete opening or closing movement.

14. The roof console of claim 12, wherein the touch-slide operating element is configured to control a sliding/tilting roof such that tapping at any point on the touch-slide operating element causes a movement into a tilted position or a closing of the sliding/tilting roof from the tilted position.

* * * * *